(No Model.) 6 Sheets—Sheet 3.

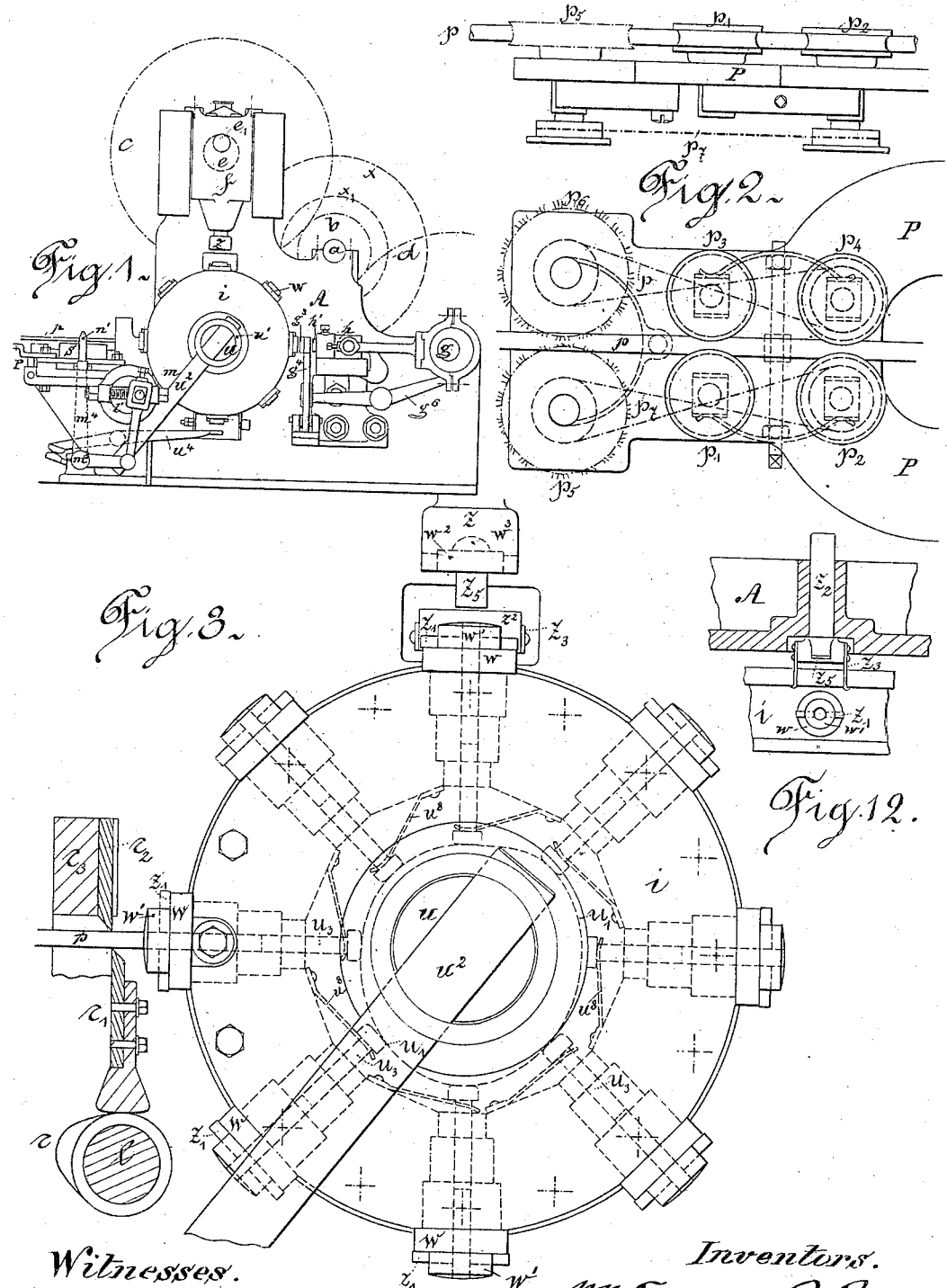

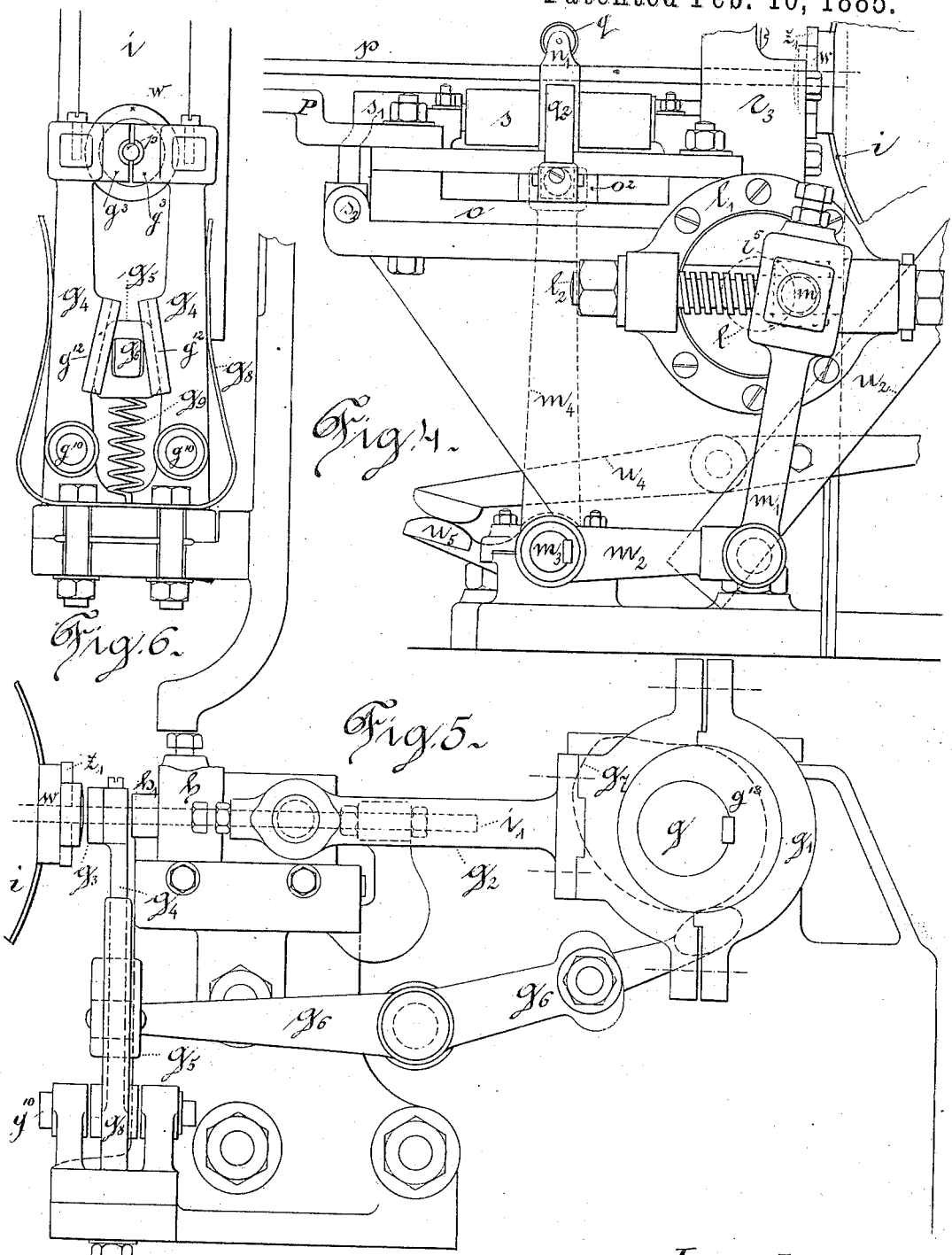

W. FISCHER & R. BUSEK.
MACHINE FOR MAKING BOLTS, RIVETS, &c.

No. 311,969. Patented Feb. 10, 1885.

Witnesses:

Inventors:
Wm Fischer & R. Busek
per Beury & Roeder
Attorney (No Model.) W. FISCHER & R. BUSEK. 6 Sheets—Sheet 4.
MACHINE FOR MAKING BOLTS, RIVETS, &c.
No. 311,969. Patented Feb. 10, 1885.
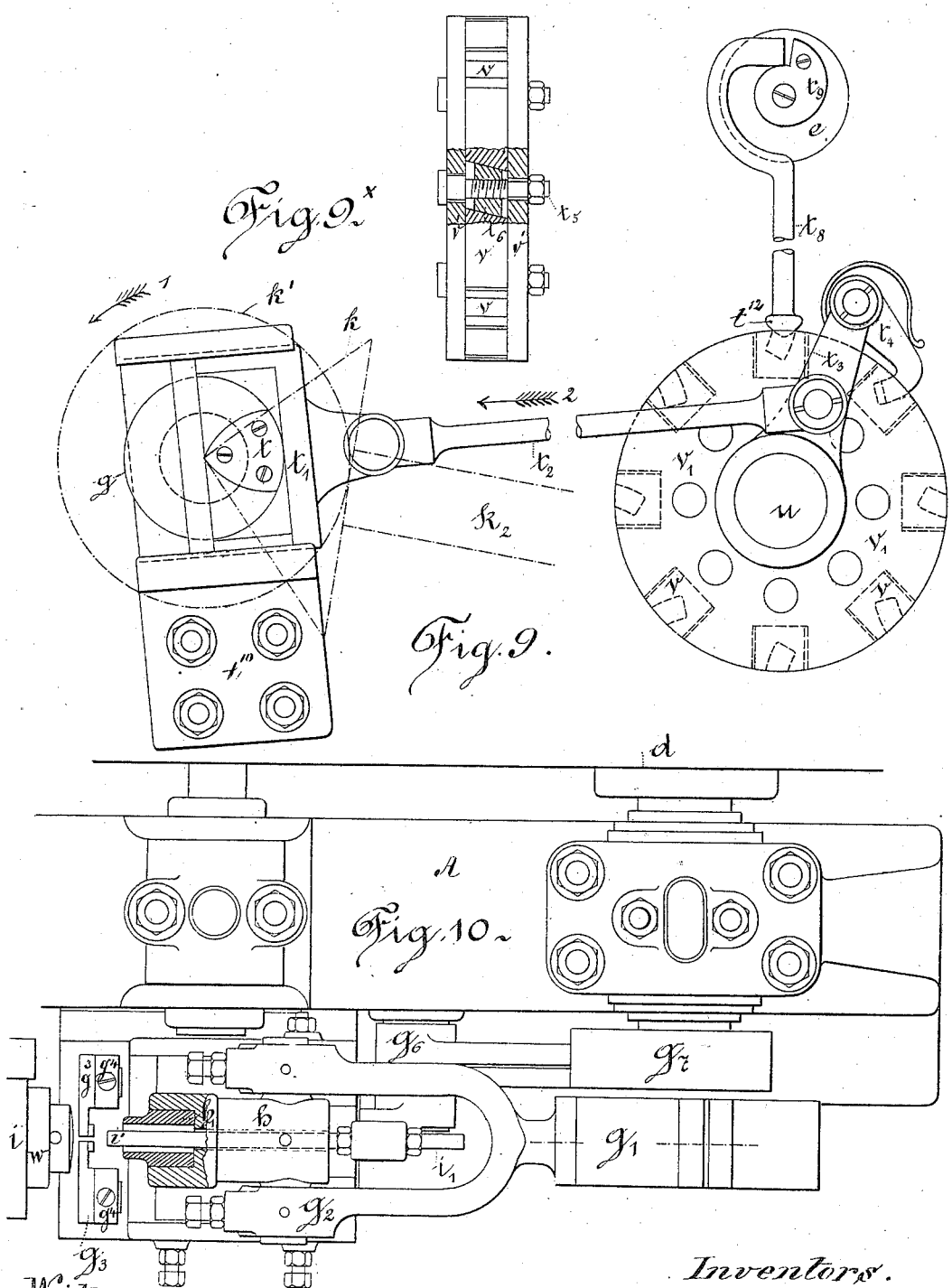
Witnesses.
E. Lindgens
G. Sarriguet
Inventors.
Wilhelm Fischer & Rud. Busek
per Maury & Roeder
Attorneys.

(No Model.) W. FISCHER & R. BUSEK. 6 Sheets—Sheet 5.
MACHINE FOR MAKING BOLTS, RIVETS, &c.
No. 311,969. Patented Feb. 10, 1885.
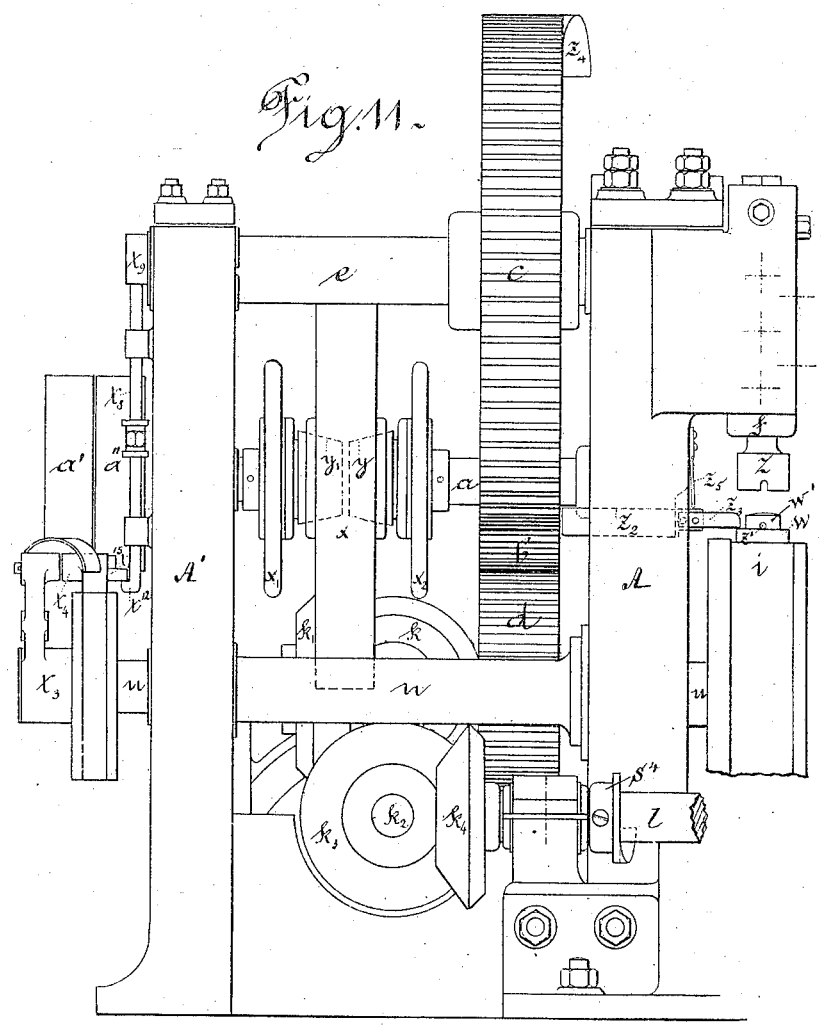

(No Model.) 6 Sheets—Sheet 6.
W. FISCHER & R. BUSEK.
MACHINE FOR MAKING BOLTS, RIVETS, &c.
No. 311,969. Patented Feb. 10, 1885.

WITNESSES: INVENTORS
William Stiles Wilhelm Fischer
 Rudolf Busek
 per Henry E. Roeder
 ATTORNEY

UNITED STATES PATENT OFFICE.

WILHELM FISCHER AND RUDOLPH BUSEK, OF VIENNA, AUSTRIA-HUNGARY.

MACHINE FOR MAKING BOLTS, RIVETS, &c.

SPECIFICATION forming part of Letters Patent No. 311,969, dated February 10, 1885.

Application filed February 28, 1884. (No model.)

*To all whom it may concern:*

Be it known that we, WILHELM FISCHER and RUDOLPH BUSEK, subjects of Austria-Hungary, and residing at Vienna, in the Empire of Austria-Hungary, have invented a new and useful Machine for Making Bolts, Rivets, &c., of which the following is a specification.

The nature of our invention consists in the arrangement and construction of suitable mechanism whereby the round or square iron is drawn into a die-wheel, the blank necessary for the formation of the bolt, rivet, &c., is cut off, the head of the bolt formed, the head trimmed and cleaned of any adhering projection or "fin," and the finished bolt, rivet, &c., pushed out or withdrawn from the die-wheel, all the operations being performed during one revolution of the die-wheel.

Figure 7:
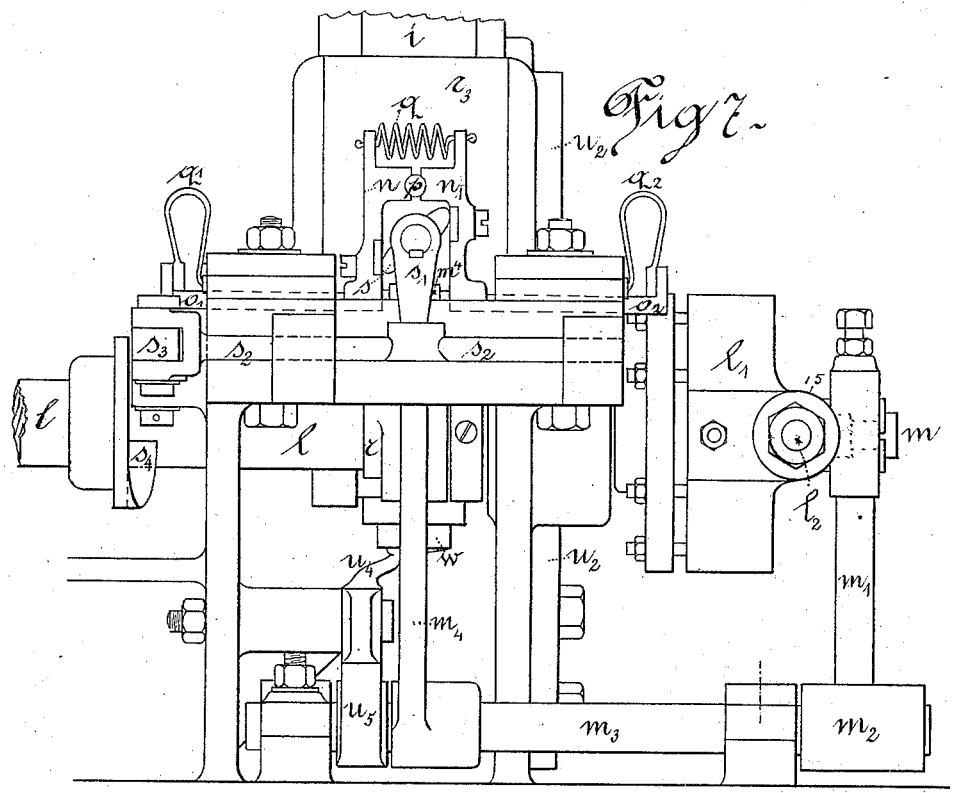
Figure 8:
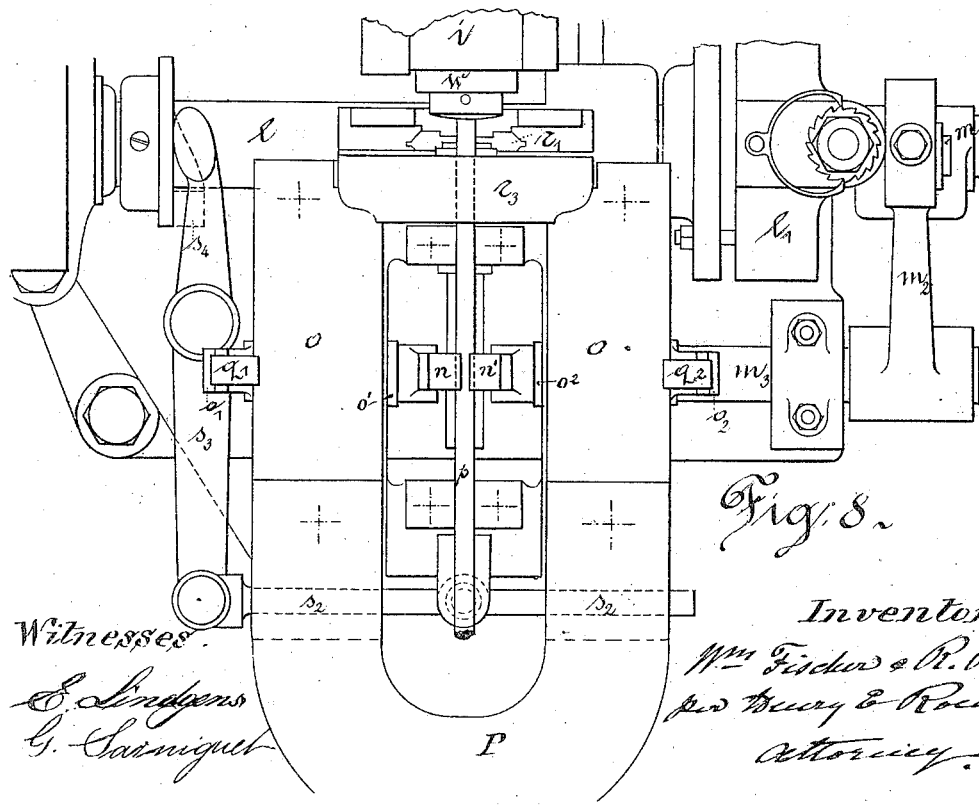
Figure 14:
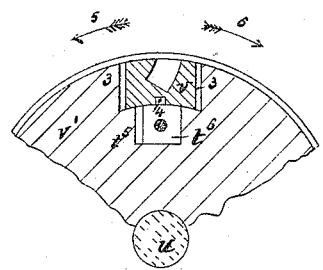
Figure 13:
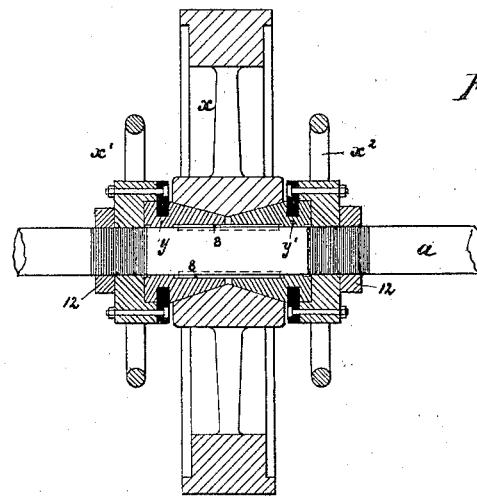

In the accompanying drawings, Figure 1 represents a side view of the machine embodying our invention. Fig. 2 is a side view and plan of the mechanism for drawing and guiding the hot iron bar toward the machine and die-wheel. Fig. 3 is a front view of the die-wheel, and Fig. 12 is a top view of part of the same. Fig. 4 is a side view of the mechanism for pushing the iron bar into the die-wheel and for withdrawing the finished bolt, rivet, &c., out of the same. Fig. 5 shows a side view of the mechanism for cleaning the head and removing any fin around its edges. Fig. 6 is a side view of the mechanism for holding the bolt, rivet, &c., during this latter operation. Fig. 7 is a front view, and Fig. 8 a top view, of the mechanism for pushing the hot iron into the die-wheel and holding the same during the operation of cutting off the necessary blank. Fig. 9 is a side view of the mechanism for operating the die-wheel, and Fig. 9× is a top view and part section of the disk-wheel of said mechanism. Fig. 10 is a top view of the mechanism for cleaning the head and cutting off the fin. Fig. 11 is a front view of part of the machine, showing the gearing for operating the various shaft-supporting and operating the several mechanisms above specified. Fig. 13 is a section of the fly-wheel and attachment. Fig. 14 shows part of wheel $v'$ and the arrangement of the blocks $v$.

Similar letters represent similar parts in all the figures.

On the driving-shaft $a$, Figs. 1 and 11, provided with fast and loose pulleys $a'\ a''$, a pinion, $b$, is arranged, working into two gear-wheels, $c$ and $d$, of equal diameter, to give motion to the shafts $e$ and $g$. This pinion and gear-wheels are shown in dotted lines in Fig. 1. The shaft $g$ communicates motion to the shaft $u$ through a peculiar mechanism, hereinafter described.

On the shaft $g$ a bevel-wheel, $k'$, is placed, working into a bevel-wheel, $k$, (shown in dotted lines in Fig. 9,) fast on a shaft, $k^2$, running diagonally toward the center of a shaft, $l$, and connected with the same through bevel-wheel $k^3$, fast on the end of the shaft $k^2$, meshing into a corresponding bevel-wheel, $k^4$, attached to the shaft $l$, whereby the necessary motion is given to said shaft $l$. The shaft $e$, which receives its motion from its gear-wheel $c$ in connection with the pinion $b$, is provided with a pin, $e'$, eccentric with the center of this shaft $e$, and operates thereby the slide $f$, to which the heading-die $z$ is attached, upward and downward in suitable guides provided on the frame A.

At the outer end of the shaft $l$, a head, $l'$, is securely fastened, carrying a screw, $l^2$, Fig. 4, upon which a nut, $l^3$, (shown in dotted lines,) is made to work, which by turning said screw $l^2$ can be moved nearer to or farther away from the center of the shaft $l$. This nut $l^3$ is provided with a stud, $m$, connected through a rod, $m'$, with a lever, $m^2$, fast on a shaft, $m^3$, which latter carries a lever, $m^4$, attached at its upper end to slides $o'\ o^2$, moving in suitable ways or guides in the frames $o\ o$. To these slides $o'\ o^2$ jaws $n$ and $n'$ are attached. These slides $o'\ o^2$ with their respective jaws $n\ n'$ are capable of moving at the same time sidewise, and are acted upon by suitable springs, $q\ q'q^2$, Fig. 7, operating in such a manner as to force said slides and jaws together to embrace and hold the hot iron bar and move the same toward the die-wheel $i$ and into one of the matrices or dies $w$, arranged in said die-wheel $i$. The hot iron bar $p$ coming from the furnace (which should be placed close to the machine) is conducted between two revolving steel brushes, $p^5\ p^6$, and grooved rollers $p'\ p^2\ p^3\ p^4$ to the jaws $n\ n'$. The brushes $p^5\ p^6$ clean the iron bar of all cinders and scale, and are connected through bands $p^7\ p^7$ with the spindles of the rollers $p^2$ $p^4$, from which they receive their required rotary motion. The rollers $p'$ $p^2$ $p^3$ $p^4$ and brushes $p^5$ $p^6$ are pressed by suitable springs against the iron bar $p$, (see Fig. 2,) and are supported on a suitable plate, P P, attached to the front of the guiding-frames $o\,o$. When, through the forward motion of the jaws $n\,n'$, the iron bar $p$ has been moved the required distance into one of the matrices or dies $w$ in the die-wheel $i$, which amount of motion can be regulated by the position of the nut $l^5$ on the screw $l^2$, as above described, a cam, $r$, attached to the shaft $l$, Fig. 3, will move the knife $r'$ upward, to act, together with a stationary knife, $r^2$, fast to a projecting part, $r^3$, of the frame, so as to cut the iron bar through, leaving the blank necessary for the desired length of the bolt, rivet, &c., and for the head to be formed thereon in the matrix or die $w$ in the die-wheel $i$. The jaws $n\,n'$ are then opened, so as to allow the bar $p$ to be moved by a succeeding operation into the next and adjoining matrix or die $w$, which the die-wheel $i$ has moved into a position to receive the same, while the cut-off blank in the die $w$ is brought by the motion of the die-wheel toward the heading-die $z$. This opening of the jaws $n\,n'$ is produced by the double thumb-lever $s$, operated by an arm, $s'$, attached to a sliding bar, $s^2$. (See Figs. 7 and 8.) The end of this sliding bar $s^2$ connects with a lever, $s^3$, operated through a cam-disk, $s^4$, fastened on the shaft $l$. By this mechanism the thumb-lever $s$ forces the jaws $n\,n'$ apart as soon as the blank has been cut off, and keeps the same during the back motion of said jaws apart until they come in the position to grip again the iron bar, when the thumb-lever $s$ will come clear of the jaws $n\,n'$, and the springs $q\,q'\,q^2$ will close again the jaws $n\,n'$, as above described, so as to move again the necessary amount of the iron bar $p$ toward the machine and into the die-wheel during the forward motion of said jaws $n\,n'$. The motion of the die-wheel $i$ brings now the blank under the heading-die $z$, when the downward motion of the slide $f$, to which said heading-die $z$ is attached, will form the desired head on the end of the blank. At the same time projecting pins $z'$, fitted into the projecting end of each matrix or die $w$, (see Figs. 3, 12, and 11,) are forced against the shank of the bolt or rivet, to hold the same firmly in its place when the heading-die $z$ moves again upward, and thus prevent the pulling out of the headed bolt or rivet during this upward motion of the heading-die $z$. The pins $z'$ are held in the projecting ends of the dies $w$ by suitable pins working in grooves provided in said pins $z'$, or by any other suitable mechanical contrivance, to prevent the same falling out during the revolution of the die-wheel. These pins $z'$ are forced tightly against the shank of the bolt or rivet, &c., by clasp-springs $z^3\,z^3$, attached to the end of a sliding bar, $z^2$, which latter is moved outward by a cam or projection, $z^4$, Fig. 11, attached to the gear-wheel $c$. The sliding bar $z^2$ moves through the frame A, and is moved forward by the cam or projection $z^4$, and is returned by the action of a spring, $z^5$. A further motion of the die-wheel $i$ brings the headed bolt opposite the trimming mechanism, where any "fin" at the end of the head produced by the formation of the head is cut off. During the passage of the headed bolt from the heading-die $z$ to the trimming-die $h'$ the bolt has been partly moved out of its matrix or die $w$ by the action of a bolt, $u^3$, situated in the die-wheel $i$, as will be hereinafter described. The thus partly moved out bolt is taken hold of at the shank close behind its head by jaws $g^3$ at the ends of levers $g^4\,g^4$, and said jaws $g^3$ act as a backing for the head during the operation of the trimming-die $h'$ while cutting off the fin around the head. These levers $g^4\,g^4$, (see Figs. 5, 6, and 10,) which carry at their upper ends the suitable jaws, $g^3$ $g^3$, to take hold of the shank of the bolt, turn on suitable centers, $g^{10}\,g^{10}$, attached to the frame, and are capable of being opened or closed. Against the outside of these levers strong springs $g^8\,g^8$ are arranged, through the action of which said levers are closed to hold the bolt firmly between their jaws $g^3\,g^3$. At the inner sides of these levers inclined surfaces $g^{12}\,g^{12}$ are provided, between and against which a wedge-shaped block, $g^5$, is made to work. Whenever this block $g^5$ is moved upward, Fig. 6, the levers $g^4\,g^4$ will be forced apart, so as to open and allow the bolt to pass freely between them. A spring, $g^9$, attached to this wedge-shaped block $g^5$, draws the same downward when not acted upon otherwise. This block $g^5$ is connected to the end of a lever, $g^6$, the other end of which is acted upon by a cam, $g^7$, fast upon the shaft $g$, and receives from the same the desired motion for the purpose specified at the proper time.

The trimming mechanism consists of a sliding block, $h$, attached to a forked eccentric-rod, $g^2$, with a ring-head $g'$, embracing an eccentric, $g^{13}$, fast on the shaft $g$, by which the desired forward and backward motion is given to said block $h$. (See Figs. 5 and 10.) In the forward end of this sliding block $h$ the trimming tool or die $h'$ is fixed, made hollow, of the exact size and shape of the head desired on the bolt, which, when moved over said head, will trim or cut off any fin which may be around said head.

To prevent the bolt being drawn out of the matrix in the die-wheel $i$ during the backward motion of the block $h$ and trimming tool or die $h'$, a rod, $i'$, is fixed to the frame on which the block $h$ moves, passing through a central opening in the block $h$ and die $h'$, against which the head of the bolt, now partly supported in the matrix $w$, will rest. During the further revolution of the die-wheel $i$ the now headed and trimmed-off bolt will come into the lowest position and will be further pushed out by the action of the internal bolt, $u^3$.

To insure the total withdrawal of the finished bolt out of its matrix $w$, the bolt comes at that position between a fork end, $u^6$, of lever $u^4$, Figs. 1 and 4, with its head below said forked end, when a downward motion of that end of the lever $u^4$ will withdraw the finished bolt out of the matrix. This lever $u^4$ receives the proper motion from the action of a lever, $u^5$, attached to the shaft $m^3$.

The die-wheel $i$, Fig. 3, is provided with four, eight, or sixteen matrices or dies, $w$, fitted into its circumference and secured by suitable set-screws. The central opening of these matrices or dies, it will be understood, must correspond with the size and shape or section of the bolt, rivet, &c., to be operated upon. In the central part of this die-wheel $i$, which is securely fastened upon the shaft $u$, an eccentric or cam wheel, $u'$, is placed loosely upon the shaft $u$ and held stationary by a rod, $u^2$. Against this eccentric or cam wheel $u'$ the heads of the bolts or pins $u^3$ work, and are kept in contact by suitable springs, $u^8$. The outer ends of these bolts work in the central openings of the matrices or dies $w$, and must correspond with the cross-section of the same, and must be regulated in regard to their length with the length the bolt, rivet, &c., is required to be. The outer ends of these bolts or pins $u^3$ form the bottoms of the matrices or dies, and when the hot bar is inserted assist in regulating the length of the blank, and when the blanks are opposite the heading-die $z$, and the same operates upon said blanks to form the heads of the bolts or rivets, said bolts or pins $u^3$, resting at their other ends against the face of the eccentric or cam $u'$, act as anvil-blocks during the operation of the heading of the bolts. When the headed bolt comes opposite the trimming-die $h'$, the eccentric or cam wheel $u'$ has moved the bolt $u^3$, and consequently the headed bolt, partly out, as above mentioned, and while the die-wheel $i$ brings the headed bolt into its lowest position the cam-wheel $u'$ operates this pin $u^3$ so as to move the same still farther outward, so as to throw the finished bolt out of the matrix or to bring the same in such a position that the lever $u^4$ can take hold of the same and draw this finished bolt quite out of the matrix, as fully above described.

It will be perceived from the above that for the purpose of performing the different operations, although the same are performed at one and the same time at different parts of the circumference of the die-wheel $i$, this die-wheel must make one-quarter or one-eighth or one sixteenth part of a revolution, according to the number of matrices arranged in its circumference, and then remain stationary during the performance of said operations. This necessary motion is communicated to the die-wheel $i$ or to its shaft $u$ through the mechanism shown in Fig. 9.

In a suitable frame, $t^{10}$, attached to the outer main frame, $A'$, near the end of the shaft $g$, a frame, $t'$, is arranged to slide, embracing a triangular or other suitably-shaped cam, $t$, securely fastened to the end of the shaft $g$. The frame $t'$ has a rectangular opening of such dimensions that the cam $t$ shall act only against its front and rear sides to communicate a forward and backward motion only to said frame $t'$. A rod, $t^2$, connects this frame $t'$ with a lever, $t^3$, turning loosely on the end of the shaft $u$, on the other end of which the die-wheel $i$ is securely fastened. The end of the lever $t^3$ carries a pawl, $t^4$, acting in suitable openings in blocks $v$, inserted in the circumference of a disk-wheel, $v'$, securely fastened on the shaft $u$. The shaft $g$ and cam $t$ turning in the direction indicated by the arrow 1, the cam $t$ will cause the frame $t'$, rod $t^2$, and lever $t^3$ to move in the direction of the arrow 2, and as the pawl $t^4$ is in the hole of one of the blocks $v$ of the disk-wheel $v'$, said disk-wheel $v'$ will be turned partly around until a projection, $t^{15}$, on the pawl $t^4$ comes over the nose $t^{12}$ at the end of the rod $t^8$, when the action of said rod $t^8$ lifts the pawl $t^4$ out of the hole in the block $v$, causing thereby the disk-wheel $v'$ to remain stationary. The regular rotation of the cam $t$ will, in consequence of its triangular shape, move the frame $t'$ in the direction of arrow 2, for the purpose of moving the disk $v'$ the distance from one block $v$ to the adjoining block, as above described. The frame $t'$ will then remain some time stationary, and will then be moved in the contrary direction, or backward, and then remain again some time stationary before the forward motion in the direction of arrow 2 is communicated to the same. The action of this triangular cam $t$ upon the frame $t'$, and the parts connected therewith, while making one revolution is as follows: From zero to sixty degrees, rest; from sixty degrees to one hundred and eighty degrees, forward motion in the direction of the arrow 2; from one hundred and eighty degrees to two hundred and forty degrees, rest; and from two hundred and forty degrees to three hundred and sixty degrees, backward motion. During the backward motion of the frame $t'$ the pawl $t^4$, which has then been relieved from the action of the nose $t^{12}$ of the rod $t^8$, will come into the hole or recess of the adjoining block $v$, ready to move the wheel $v'$ again by the next forward motion of the frame $t'$ the required distance around.

As above mentioned, the disk-wheel $v'$ is firmly attached to one end of the shaft $u$, at the other end of which the die-wheel $i$ is securely fastened, and consequently any motion given to said disk-wheel $v'$ will be communicated to the shaft $u$ and to the die-wheel $i$.

At the end of the shaft $e$ a cam, $t^9$, is attached, upon the surface of which the bent end of the rod $t^8$ rests, and by said cam the desired motion at the proper time is given to said rod $t^8$ for the purpose of lifting the pawl $t^4$ out of the hole in the block $v$ when required.

To insure the exact motion of the die-wheel $i$, and insure at the same time the central position of the dies $w$ with the feeding, heading, and trimming devices, the blocks $v$ are fitted into the disk-wheel $v'$, and are capable of being regulated by the screws $t^5$, whereby these blocks $v$ can be regulated with the greatest minuteness, and consequently the exact position of the die-wheel $i$ be regulated. The blocks $v$ are fitted into the circumference of the wheel $v'$ in recesses square to its face, with sufficient clearance-space 3 3 at each end to allow the blocks $v$ to be adjusted. (See Figs. 9× and 12.) Below each block $v$ a block, $t^6$, is fitted into a recess in the wheel $v'$ diagonal to the axis $u$. Into this block $t^6$ a bolt, $t^5$, is screwed. This block $t^6$ is connected to the block $v$ by a pin or projection, 4, working in a suitable recess in the underside of the block $v$. By turning the bolt $t^5$ toward the right or left the block $t^6$, moving obliquely to the shaft $u$, causes thereby a movement of the block $v$ square to this shaft $u$, either in the direction of the arrow 5 or of arrow 6 on the face of the wheel $v'$, by which arrangement the block $v$ can be regulated with the greatest minuteness.

To insure the central or concentric position of the head in relation with the shank of the bolt, rivet, &c., by the operation of the heading-die $z$, this heading-die $z$ is provided with a rim projecting below the face, in which the cavity $w^3$ for the desired head is made, forming a cavity, $w^2$, Fig. 3, fitting over a projecting part, $w'$, on the matrix $w$ concentric with its central opening, and the recess or cavity $w^3$ corresponding to the desired head to be made on the bolt, rivet, &c., is made in the face of the end of this cavity $w^2$, instead of in the end of the die $z$, as is usual at present.

On the driving-shaft $a$ two conical sleeves, $y$ $y'$, Figs. 11 and 13, are placed, capable of moving longitudinally on the shaft $a$ on suitable keys, $s$ $s$, fastened in said shaft. Hand-wheels $x'$ $x^2$ are connected to said disks $y$ $y'$ and screwed upon the shaft $a$. Against the outsides of the hubs of said hand-wheels lock-nuts 12 12 are arranged. By this arrangement the disks $y$ $y'$ are easily moved nearer together or farther apart from each other. Upon these conical sleeves the fly-wheel $x$ is placed, bored out to conform with the conical shape of said sleeves $y$ $y'$.

In case of any stoppage resulting from any disarrangement of any part of the mechanism or from any possible obstruction in the machine, this fly-wheel $x$ will turn upon these conical sleeves $y$ $y'$, thus allowing the stoppage of the machine and avoiding any breakage of the same.

What we claim as our invention, and desire to secure by Letters Patent, is—

1. The combination of the slides $o'$ $o^2$ with jaws $n$ $n'$ and the springs $q$ $q'$ $q^2$, lever $m^4$, shaft $m^3$, levers $m^2$, rod $m'$, nut $l^5$, with side stud, $m$, screw $l^2$, head $l'$, and shaft $l$, arranged to operate in the manner and for the purpose substantially as described.

2. In combination with the slides $o'$ $o^2$, jaws $n$ $n'$, and springs $q$ $q'$ $q^2$, the double-thumb lever $s$, arm $s'$, sliding bar $s^2$, lever $s^3$, and cam-disk $s^4$, fastened upon the shaft $l$, arranged to operate in the manner and for the purpose substantially as set forth.

3. In combination with levers $g^4$ $g^4$, provided with jaws $g^3$ $g^3$ on their upper ends and inclined surfaces $g^{12}$ $g^{12}$ on their inner edges, the wedge-shaped block $g^5$, with spring $g^9$, and the lever $g^6$, cam $g^7$, and shaft $g$, arranged to operate in the manner and for the purpose substantially as specified.

4. In combination with the sliding block $h$, forked eccentric-rod $g^2$, eccentric $g^{13}$, the trimming tool or die $h'$, attached or fastened into the block $h$, and the stationary rod $i'$, passing through the center of the sliding block $h$, and trimming-tool $h'$, arranged to operate in the manner and for the purpose substantially as described.

5. The herein-described trimming mechanism, consisting of the combination of the clamping-jaws $g^3$ $g^3$, attached to suitable levers, $g^4$ $g^4$, embracing the headed bolt close to its head, the trimming-tool $h'$, sliding block $h$, eccentric-rod $g^2$, eccentric $g^{13}$, and stationary bolt $i'$, the whole being arranged to operate in the manner substantially as set forth.

6. The combination of the lever $u^4$, having a forked end $u^6$, and lever $u^5$, attached to the shaft $m^3$, and means for turning the shaft $m^3$, arranged to operate in connection with a headed bolt partly moved out of the die-wheel $i$, in the manner and for the purpose substantially as specified.

7. In combination with the matrices $w$, attached to a die-wheel, $i$, the pins $z'$, slide $z^2$, clasp-springs $z^3$ $z^3$, spring $z^5$, and cam or projection $z^4$, attached to the gear-wheel $c$, arranged to operate in the manner and for the purpose substantially as described.

8. A machine for making bolts, rivets, &c., consisting of the combination of a die-wheel, $i$, provided with suitable matrices or dies, $w$, jaws $n$ $n'$, heading-die $z$, levers $g^4$ $g^4$, provided with jaws $g^3$ $g^3$, trimming tool or die $h'$, and withdrawing-lever $u^4$, with means for operating the several parts, the whole being constructed and arranged to operate substantially as described, and in the manner and for the purpose herein set forth and specified.

WILHELM FISCHER.
RUD. BUSEK.

Witnesses:
JACOB FRIED,
GUS. D. APPENHEIM.